J. HYDE, DEC'D.
C. HYDE, ADMINISTRATRIX.
FUEL FEEDING APPARATUS.
APPLICATION FILED SEPT. 17, 1912.
1,116,066.
Patented Nov. 3, 1914.
3 SHEETS—SHEET 1.
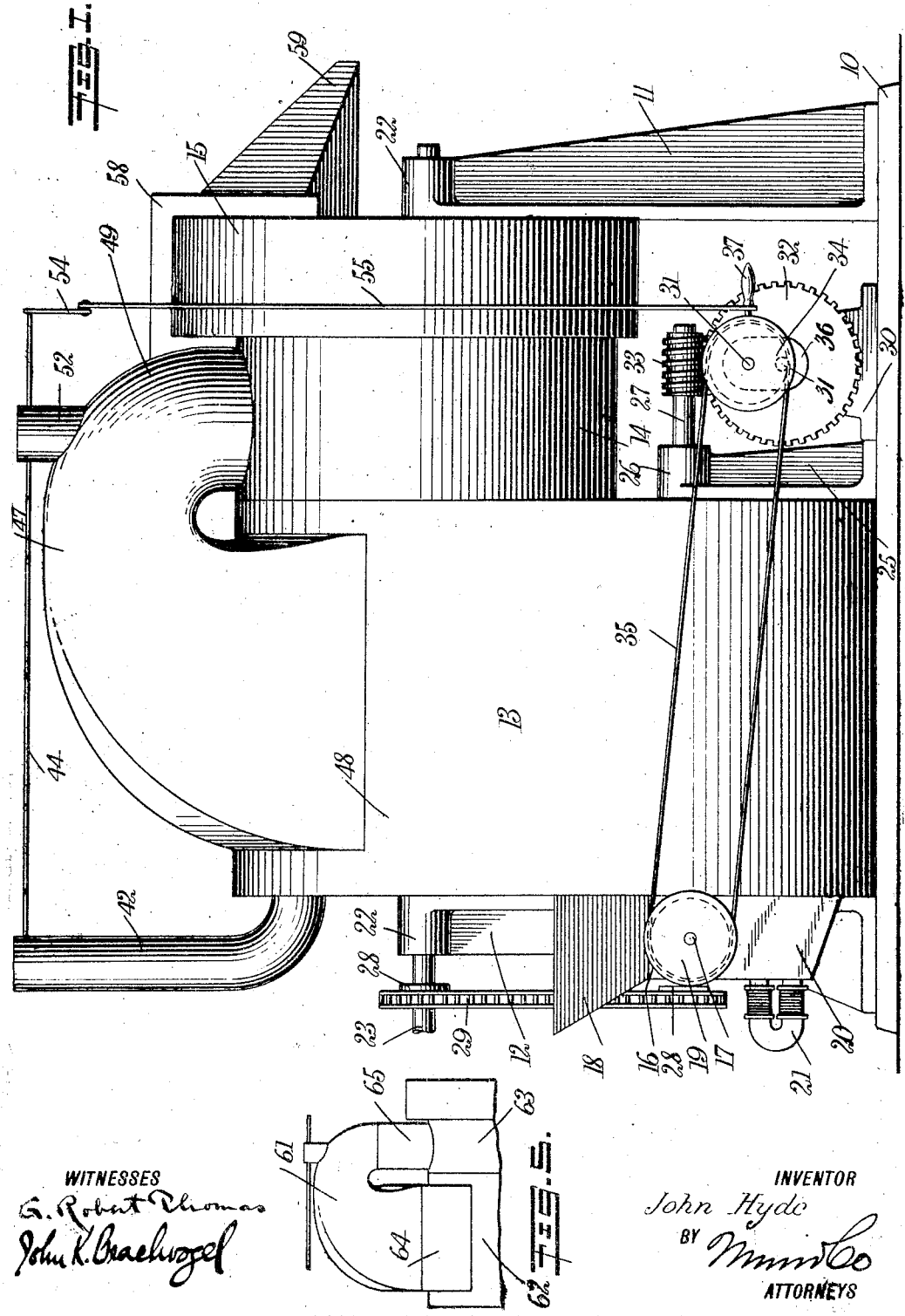

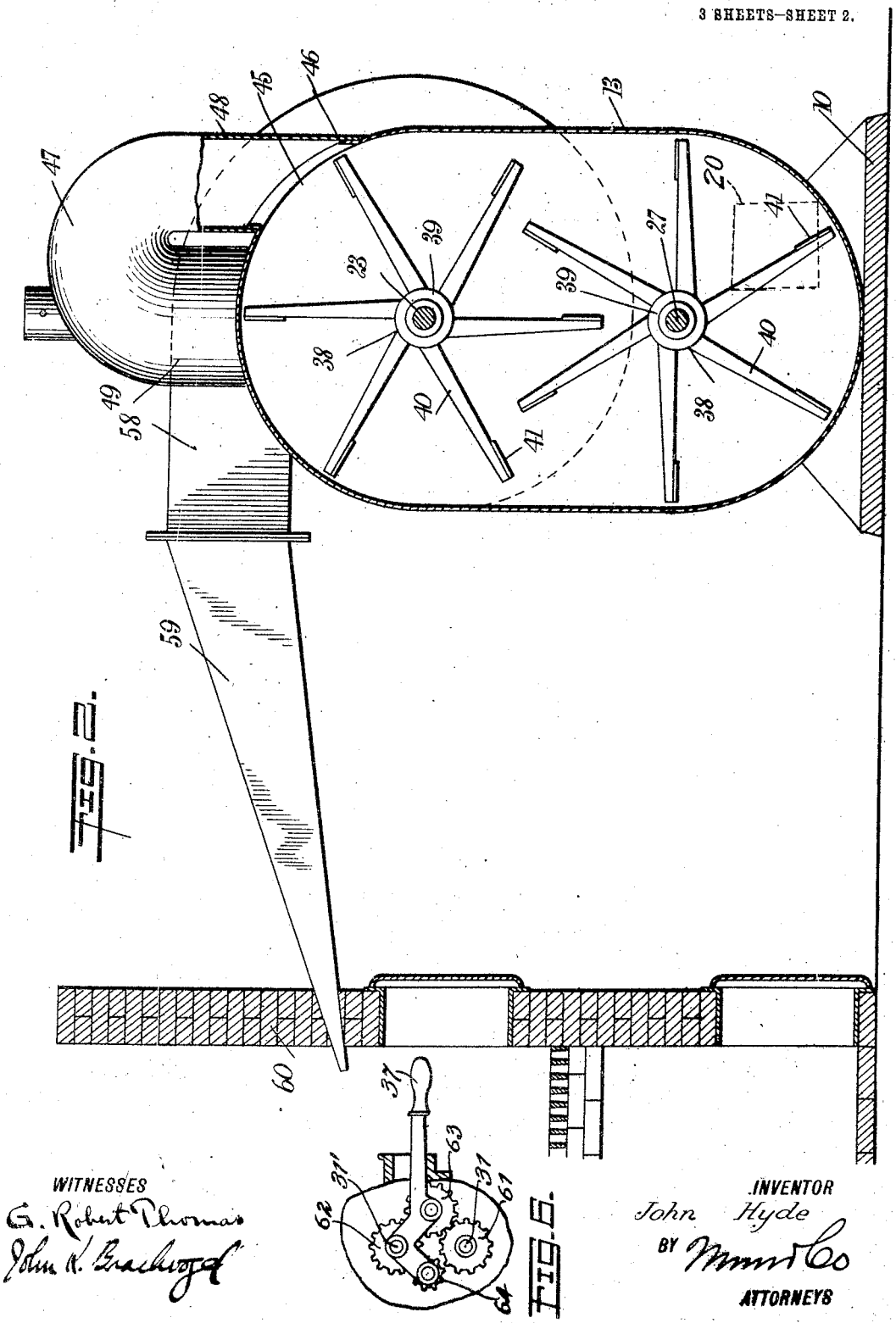

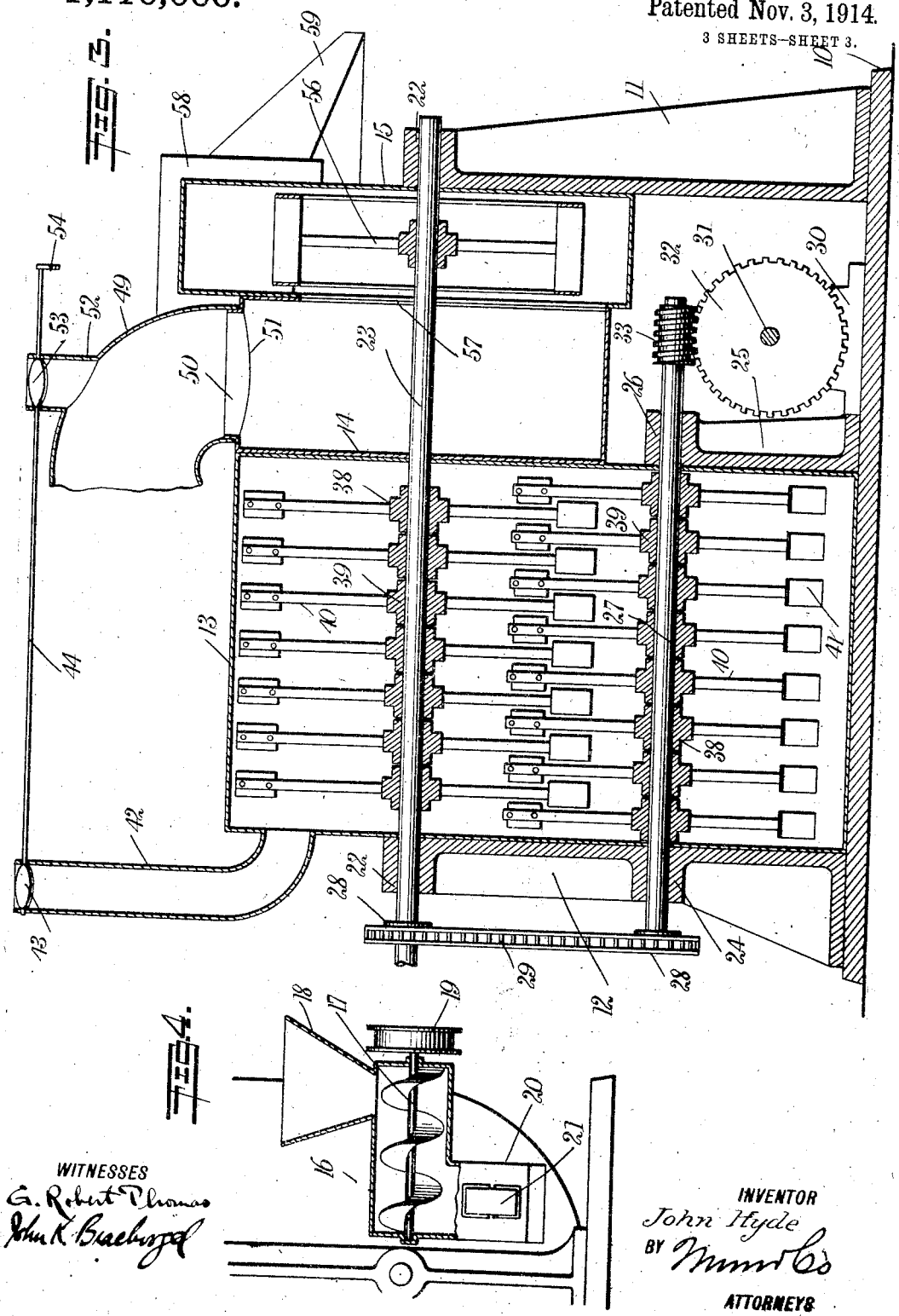

UNITED STATES PATENT OFFICE.

JOHN HYDE, OF PITTSBURGH, PENNSYLVANIA; CATHERINE HYDE ADMINISTRATRIX OF SAID JOHN HYDE, DECEASED.

FUEL-FEEDING APPARATUS.

1,116,066.  Specification of Letters Patent.  Patented Nov. 3, 1914.

Application filed September 17, 1912. Serial No. 720,734.

*To all whom it may concern:*

Be it known that I, JOHN HYDE, a citizen of the United States, and a resident of Pittsburgh, in the county of Allegheny and State of Pennsylvania, have invented a new and Improved Fuel-Feeding Apparatus, of which the following is a full, clear, and exact description.

This invention relates to apparatus for adapting coal and other like fuel for efficient combustion in a finely divided state admixed with air, and has reference more particularly to apparatus of the class described which comprises a casing having a fuel inlet and a fuel outlet, means in the casing for comminuting the fuel, the casing having an air inlet, means for controlling the introduction of the fuel into the casing, and means operable simultaneously with the last-mentioned, controlling means, and serving in turn to control the air inlet.

The object of the invention is to provide a simple and efficient apparatus of the class described, by means of which coal and like fuel can be rapidly and easily comminuted and thoroughly mixed with air, to adapt it for combustion in its finely divided condition, under boilers, or for other purposes, which produces a perfect admixture of the finely divided fuel, and air, which produces a fuel mixture that will burn without the formation of clinkers or other deleterious residual aggregations, which requires comparatively little power to drive it, and in which the amount of air entering is controlled directly and automatically by the means for varying the introduction of the fuel into the apparatus, so that as the operation of the device is varied in accordance with the amount of fuel or the nature of the fuel, the amount of air entering to be mixed with the finely divided fuel is likewise automatically controlled.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of fuel apparatus constituting an embodiment of my invention; Fig. 2 is a transverse section showing the comminuting mechanism; Fig. 3 is a longitudinal section of the fuel apparatus, showing the means for introducing the fuel into the apparatus; Fig. 4 is a detailed structure of the feed from the hopper to the fuel comminuting casing; Fig. 5 is a modified form of a conduit, and Fig. 6 is an enlarged detail view of the speed changing mechanism.

Before proceeding to a more detailed explanation of my invention, it should be understood that the present form of the apparatus constitutes an improvement upon that shown in my co-pending United States application Serial No. 652052, filed September 30, 1911. The present type of the invention as well as that shown in the prior application, is particularly intended for use with soft coal, but fuels of other kinds can also be advantageously employed therein. I prefer to associate the apparatus directly with a boiler or series of boilers, the furnaces of which are designed for use with fuel mixtures such as that provided by the device. Needless to say, it can be employed for other purposes than firing boilers.

I have not shown an actuating mechanism for the apparatus, but it will be understood that a steam turbine, an electric motor, or any other suitable means capable of employment for the purpose can be used. Furthermore, certain of the details of construction, shown for example herewith, form no part of the invention, and can be varied in accordance with individual preference and special conditions, without deviating from the spirit of the invention as defined in the appended claims.

In the present form of the device, fuel is introduced into one end of the casing and is comminuted by rotary members operating in that part of the casing which receives the fuel first. Air is also introduced into this part of the casing. The finely divided fuel is then drawn from this portion of the casing and passes into a second part of the casing through a conduit which gradually decreases in cross-section. That portion of the conduit which communicates directly with the first part of the casing extends along substantially the entire length of the same. A blower is located in the third part of the casing, and the fuel mixture is advanced by it through the conduit, and then to the nozzle for feeding the fuel mixture directly to the point of its combustion. Air is also admitted to the conduit, and both of the air inlets are automatically controlled as will be pointed out later.

It will be seen that the present type of my invention differs from the customary one, in which fuel is admitted at one end of the casing, is comminuted, and passes through the casing, being drawn off at the opposite end.

My invention also resides in the automatic control of the entering air simultaneously with the controlling of the operation of the feeding mechanism.

Referring more particularly to the drawings, I have shown a suitable base or support 10 having at the ends, uprights 11 and 12. Between the uprights are mounted the casing sections 13, 14 and 15, which are preferably fashioned from sheet metal. The sections 14 and 15 are substantially cylindrical, while the section 13, the largest of the three, is rounded at the top and bottom, but has flat sides. The section 13 has associated therewith a fuel inlet feed 16 comprising a substantially horizontal conduit in which is operatively mounted a worm conveyer 17. A hopper 18 is mounted upon the conduit and serves for the introduction of the fuel. The shaft of the worm conveyer is suitably journaled at the ends of the conduit, and is provided with a pulley 19 by means of which it can be belt-driven. The conduit 16 has a downwardly directed portion 20 which opens into the lower part of the casing section 13. An electromagnet 21 is mounted upon the conduit part 20, and projects into the same. It serves to remove metallic impurities from the fuel passing through the conduit.

The uprights 11 and 12 have bearings 22 at their upper ends, in which is journaled a shaft 23 extending longitudinally of the apparatus, through the casing sections 13, 14 and 15. The upright 12 has, a suitable distance below the bearing 22, a second bearing, 24. Under the casing section 14 is an upright 25 terminating at its upper end in a bearing 26. A shaft 27 parallel to the shaft 23 is journaled in the bearings 24 and 26 and extends longitudinally through the lower portion of the casing section 13. The shafts are operatively connected by means of sprockets 28 and a chain 29, or in any other convenient manner. Journaled in a suitable framework 30 under the casing sections 14 and 15, is a transverse shaft 31 having a gear 32 mounted thereon, which meshes with a worm 33 carried by the shaft 27.

The end of the shaft 31 has a pinion 61 which drives a pinion 62 through the medium of a pinion 63 or a pinion 64 carried by the operating handle 37 pivotally mounted on the shaft 31'. At the end of the shaft 31' a pulley 34 is provided which is preferably connected by means of a belt 35 with a pulley 19 of the fuel feeding mechanism. All of said pinions 61, 62, 63 and 64 are inclosed in a suitable casing 36 and are adapted to vary the speed of the pulley 34 relatively to the shaft 27 so that the operation of the fuel-feed mechanism can be controlled. The change of speed, as can be seen, is obtained by the handle 37.

Within the casing section 13 and rigidly mounted upon the shafts 23 and 27, are rotary comminuting elements 38 each comprising a hub 39 and substantially radial arms 40, for example, six in number. The arrangement is such that the arms of each of the upper comminuting elements are received between adjacent elements of the lower set, the arms overlapping as is clearly shown in Figs. 2 and 3. I prefer to provide the comminuting elements with removable or interchangeable shoes or paddles 41 mounted at the ends of the arms by means of screws or rivets, or in any other suitable manner.

The air inlet pipe 42 extends upwardly from the casing section 13 and serves for the introduction of air at the upper part of the casing. It has, near its free end, a valve member 43 mounted upon a rod 44 journaled in suitable openings of the inlet pipe. The casing section 13, near the top and at one side, is provided with an outlet opening 45 extending longitudinally thereof and provided with an upwardly disposed flange or rim 46 extending around the edge. A conduit 47 has a correspondingly shaped and proportioned, and downwardly directed part 48 arranged at the opening 45, seating about the flange 46. The conduit is substantially U-shaped and is of decreasing cross-section, having a second, downwardly disposed part 49 of substantially circular cross-section seating at a flange 50, extending around the inlet opening 51 at the top of the second casing section 14. The conduit, near the top of the downwardly disposed portion 49, has an air inlet 52 consisting of a short, upwardly directed pipe provided with a valve member 53. The latter is mounted upon the rod 44 which extends through and is journaled in suitable bearing openings in the sides of the pipe. At the end, the rod 44 has a laterally disposed arm 54 operatively connected by means of a rod 55, with the operating member 37 of the change speed mechanism.

The shaft 23 it will be remembered, extends longitudinally through all the casing sections. A blower or fan 56 of any suitable construction is mounted rigidly upon the shaft, within the section 15. The latter communicates with the section 14, through openings 57 in the adjacent walls. An outlet conduit 58 is associated with the casing section 15 near the upper part thereof, and terminates in a tapered, laterally extended nozzle 59 of a type adapted for the introduction of a fuel mixture into the combustion chamber 60 of a boiler or the like.

The fuel is introduced into the apparatus by means of the screw conveyer 17, which advances the coal from the hopper 18 to the conduit 20 through which the coal passes into the lower portion of the casing section 13. The rapidly rotating, comminuting element breaks the lumps of coal up and finely divides the same, so that the fuel is in effect powdered.

It will be understood that the apparatus is driven in any suitable manner by applying power to the shaft 23, from an electric motor or other source. The fan 56 creates a suction and the fuel mixture is drawn from the casing section 13, into the conduit 47, air having entered through the inlet 42 into the casing section 13. It will be understood that the conduit facilitates the intimate mixing of the air and the finely divided coal. The casing section 14 is also in effect a mixing chamber as the expansion of the mixture when entering the casing 14 from the conduit 47 effects a good mixing, so that by the time the mixture reaches the casing section 15, where its constituents are further mixed by the blower, it is in a highly suitable condition for purposes of combustion. The blower advances the mixture of finely divided coal and air into the conduit 58 and through the distributing nozzle 59, whence it escapes to the combustion chamber of the boiler. The mixture passing through the conduit 47 receives through the air inlet 52, an accession of air just before it enters the mixing chamber 14.

By means of the change speed device 36, the rate at which fuel is fed into the device can be varied and exactly controlled. At the same time, the amount of air entering the casing section 13 and the conduit 47 is regulated proportionally to the feeding of the coal into the apparatus, as the valves 43 and 53 of the air inlets are operated simultaneously with the operation of the change speed mechanism.

It can be seen that the conduit 47 and the mixing chamber 14 can be considered as a single conduit connecting the chamber 13 with the chamber 15. The gradual contraction of the conduit 47 will cause the fuel and air passing through it to change its speed, assuming the speed of fan 56 to be constant. From the theory of the flow of fluids, we know that $Q = A \times V$, where $Q$ is the volume of fuel mixture delivered per unit of time, $A$ is the cross sectional area through which the delivery is made and $V$ the velocity of flow of the mixture. As the volume of fuel delivered per unit of time is to be constant and the cross-sectional area $A$ of the passage 47 is variable, it follows that the velocity of flow $V$ must be variable, varying inversely to the cross-sectional area $A$; and as shown in the drawings, the cross-sectional area of the conduit 47 gradually decreases as it approaches the mixing chamber 14, consequently it follows from the equation above stated that the speed of flow of air and particles of fuel increases as the same approaches the mixing chamber 14. In view of the fact that the particles of air and fuel possess different inertia their change in velocity will not be uniform with the change in speed of the mixture taking place due to the change in cross-sectional area of the conduit. As a result this difference in velocities will permit of far better intermingling of the fuel and air in the conduit. When the fuel and air particles enter the chamber 14, which is comparatively large, it causes the stream of flow to expand, and this expansion creates a whirl in the chamber (a well known condition explained in Flow of Fluids in any of the treatises on same), causing the fuel and air particles to intermingle, thereby forming a perfect mixture of the two.

It may be desirable to increase the length of this conduit, and this increase can be effected in any suitable manner. I have shown in Fig. 5 a modification of the preferred embodiment of the invention, in that the conduit 61 connects the sections 62 and 63, and is of greater length than the corresponding conduit 47. To increase the length, additional conduit sections 64 and 65 are interposed between the ends of the conduit 61 and respectively, the chamber sections 62 and 63.

Having thus described my invention I claim as new, and desire to secure by Letters Patent:—

1. Apparatus of the class described comprising a casing having two independent sections, fuel comminuting mechanism in one of said sections, fuel mixture advancing means in the other of said sections, a mixing chamber intermediate said sections having direct communication with said section having the fuel advancing means, and a contracting lateral conduit from said section containing the comminuting mechanism to said mixing chamber for the purpose specified.

2. Apparatus of the class described, comprising a casing having two independent sections; fuel comminuting means in one of said sections; fuel mixture advancing means in the second of said sections; a conduit connecting said sections, comprising a gradually contracting portion and an enlarged portion adjacent the contracting end of said first portion; means for feeding fuel into said first section; and a fuel mixture distributing nozzle connecting with said second section, said first section having an air inlet.

3. Apparatus of the class described comprising a casing having two independent sections, fuel comminuting means in one of said sections, fuel mixture advancing means in the other of said sections, a mixing chamber intermediate said sections having direct communication with said section having the fuel advancing means, and a gradually contracting conduit from said section containing the comminuting means to said mixing chamber for the purpose set forth, said first-mentioned section having an air and a fuel inlet and said second section having a fuel mixture outlet.

4. Apparatus of the class described, comprising a casing having two independent sections; a fuel comminuting mechanism in one of said sections; fuel mixture advancing means in the other of said sections; means for feeding fuel into said section having said comminuting means therein; and a fuel mixture distributing nozzle associated with said other section, said first section having an air inlet and a conduit of varying cross section connecting said sections for causing a variation in speed of the fuel and air particles passing from the section having the fuel feed to the section having the advancing means.

5. Apparatus of the class described, comprising a casing comprising a first section, an intermediate or mixer section, and a third section, fuel-comminuting means in said first section, a blower in said third section, said first section and said intermediate section being independent of each other, said intermediate section and said third section communicating directly, means for feeding fuel into said first section, said third section having a fuel mixture outlet, a conduit connecting said first section and said intermediate section, said first section having a valve controlled air outlet, said conduit having a valve-controlled inlet, means for varying the speed of said fuel feed, and an operative connection between said fuel feed varying means and said valve-controlled air inlets.

6. Apparatus of the class described comprising a casing having two independent sections, fuel comminuting mechanism in one of said sections, fuel mixture advancing means in the other of said sections, a mixing chamber intermediate said sections having direct communication with said section having the fuel mixture advancing means, and a gradually contracting conduit from the peripheral side of said section containing the fuel comminuting mechanism to the peripheral side of said mixing chamber and whereby the fuel and air coming from said conduit into said mixing chamber is caused to expand, said first-mentioned section having a fuel and an air inlet, said second section having a fuel mixture outlet.

7. Apparatus of the class described comprising a casing having two independent sections, fuel comminuting mechanism in one of said sections, fuel mixture advancing means in the other of said sections, a mixing chamber intermediate said sections having direct communication with said section having the fuel mixture advancing means, a gradually contracting conduit communicating with said section containing the fuel comminuting mechanism along substantially its entire length and connecting it with said mixing chamber whereby the fuel and air particles coming from said conduit into said mixing chamber are caused to expand, and thus a better intermingling of air and fuel particles is obtained, said first-mentioned section having a fuel and an air inlet, said second section having a fuel and air mixture outlet.

8. Apparatus of the class described comprising a casing having two independent sections, fuel comminuting mechanism in one of said sections, fuel mixture advancing means in the other of said sections, a mixing chamber intermediate said sections having direct communication with said section having the fuel mixture advancing means, a gradually contracting conduit communicating with said section containing the fuel comminuting mechanism along substantially its entire length and connecting it with said mixing chamber for the purpose set forth, and an independent air inlet in the contracted portion of said conduit, said first mentioned section having a fuel and an air inlet, said second section having a fuel and air mixture outlet.

9. Apparatus of the class described, comprising a casing having two independent sections, one of said sections having a fuel and an air inlet, the second section having a fuel and air mixture outlet; a comminuting mechanism in said first section; a fuel mixture advancing mechanism in the second section; and a conduit connecting the two sections comprising a portion having a gradually decreasing cross-sectional area and an enlarged portion adjacent the smallest cross-sectional area of said portion and whereby the fuel and air particles passing through said contracting portion are caused to increase in speed, and when entering said enlarged portion to decrease in speed.

10. An apparatus of the class described, comprising a casing having two independent sections, fuel comminuting mechanism in one of said sections, fuel mixture advancing means in the other of said sections, a mixing chamber intermediate said sections, said mixing chamber having an end communication with said section having the fuel advancing means, and a contracting conduit from the lateral surface of said section containing the comminuting mechanism to said mixing chamber.

In testimony whereof I have signed my name to this specification in the presence of two subscribing witnesses.

JOHN HYDE.

Witnesses:
CLARENCE N. WATKINS,
HAROLD W. WATKINS.